Dec. 6, 1955 D. M. KING 2,725,973
TROLLEY CONVEYOR
Filed Oct. 28, 1952 4 Sheets-Sheet 1
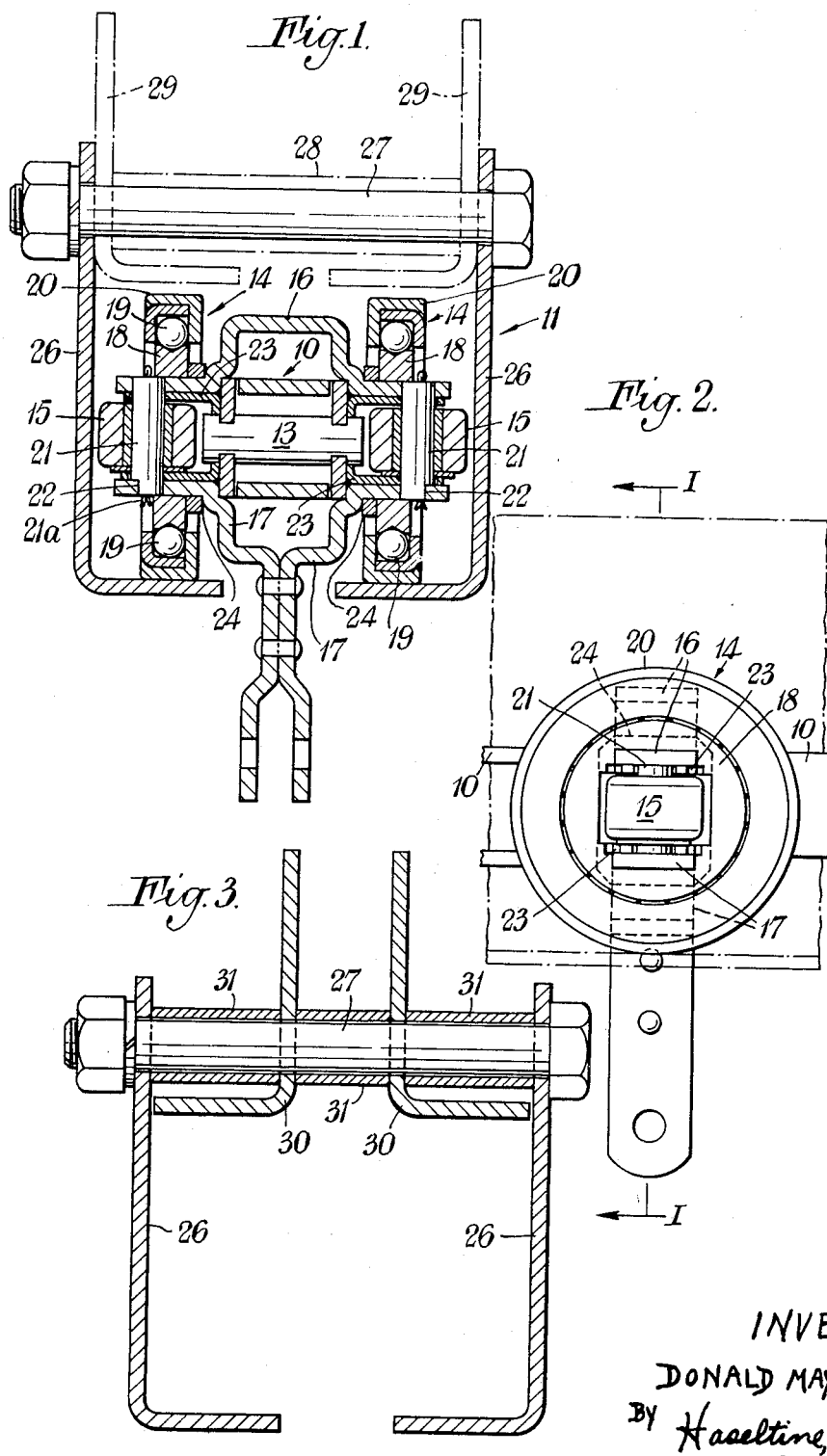
INVENTOR
DONALD MAYER KING
BY Haseltine, Lake & Co.
AGENTS Dec. 6, 1955 D. M. KING 2,725,973
TROLLEY CONVEYOR
Filed Oct. 28, 1952 4 Sheets-Sheet 2

INVENTOR
DONALD MAYER KING
BY Haseltine, Lake & Co.
AGENTS

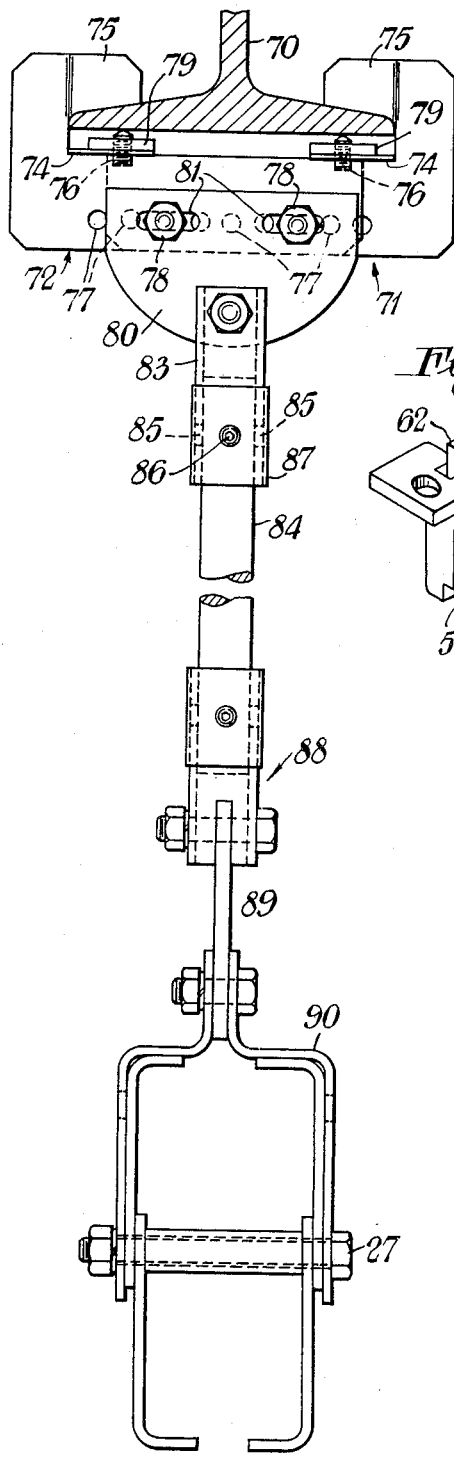

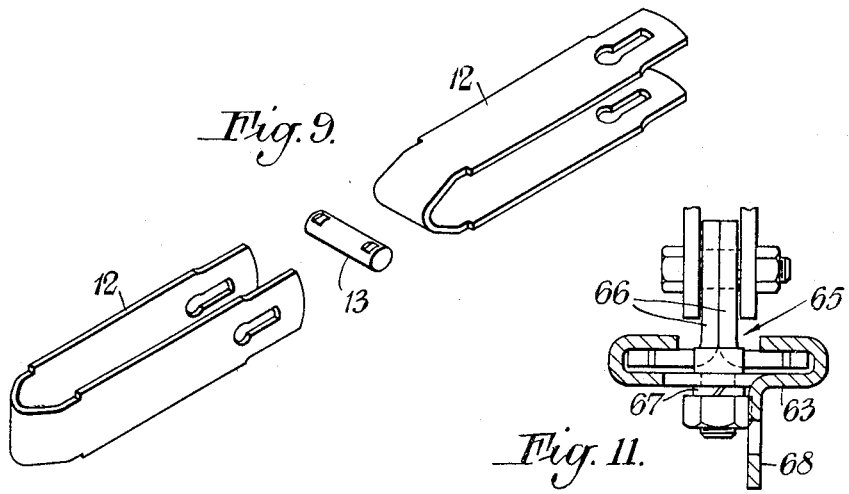
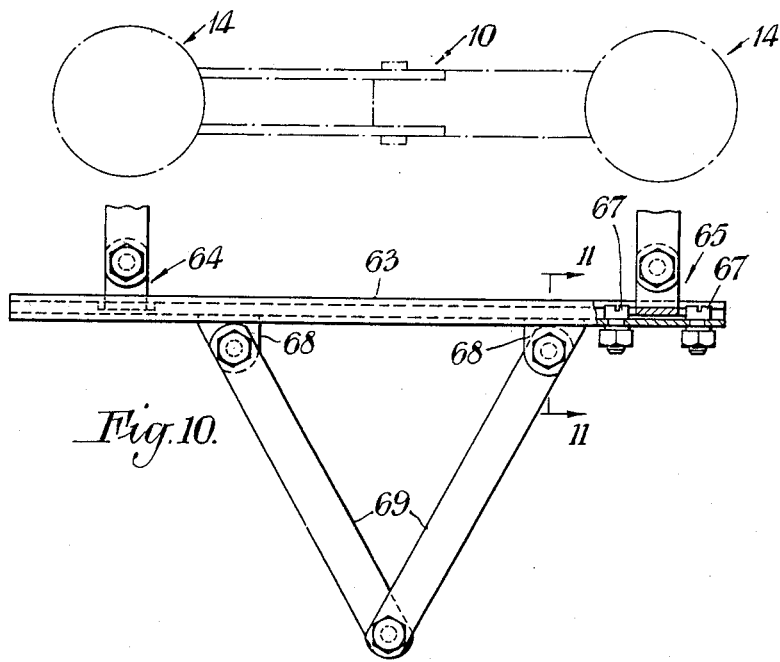
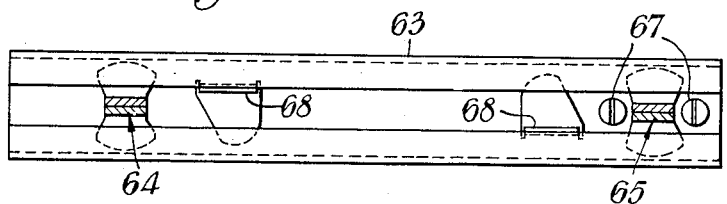

United States Patent Office 2,725,973
Patented Dec. 6, 1955

2,725,973

TROLLEY CONVEYOR

Donald Mayer King, Hitchin, England

Application October 28, 1952, Serial No. 317,319

Claims priority, application Great Britain
October 29, 1951

12 Claims. (Cl. 198—177)

This invention relates to conveyor systems and more particularly to such systems of the kind wherein an endless chain, from which loads may be suspended, is provided with a plurality of rollers which are so arranged that when the chain is extended horizontally some of said rollers will be rotatable about horizontal axes while others will be rotatable about vertical axes, said rollers being adapted to engage and run on a fixed track, thereby to support and guide the chain both vertically and laterally.

It is the chief object of the invention to evolve an improved method of and means for supporting the chain of a conveyor of the kind above referred to.

It is a further object of the invention to evolve an improved track for accommodating the conveyor chain and also to evolve an improved method of track suspension. It is yet a further object to evolve an improved load bar assembly.

In accordance with one aspect of the invention, a plurality of trolley or roller assemblies is provided, each of such assemblies being adapted to be applied to the chain and including a plurality of wheels, rollers, balls or the like, which are so disposed that when the assembly is in position on the chain, they will co-operate with the track, thereby to provide rolling support for said chain both vertically and laterally.

In accordance with a further aspect of the invention in a conveyor system wherein the load carrying trolley assemblies are disposed within a channelled track having a longitudinally extending slot or passageway in the base thereof through which depending load supporting bars, clevis attachments or the like are adapted to project, all or certain of the trolley assemblies are provided with current collector means adapted to co-operate with conductors arranged within the channelled track, the latter having resilient sealing means disposed adjacent the slot or passageway in the base thereof, such means being adapted normally to close said slot or passageway but not to impede the passage of the load bars or clevis attachments associated with the trolley assemblies.

In accordance with yet a further aspect of the invention a track for use in a conveyor system of the kind set forth is made up of two sets of rail members of substantially L-shape in section, said members being adapted to be so disposed in spaced parallel relation as to provide a channel track having a central longitudinally extending slot or passageway in the base thereof and being interconnected at spaced points by means of bolts or the like, which latter are so formed or are adapted to support means whereby the spacing between said rail members will be determined. If desired, additional or so-called cover tracks may be incorporated, such latter tracks being similarly formed of L-section rail members. A conveyor track so formed is adapted to be suspended from one or more overhead joists or other rigid supports by means of adjustable suspension units which are attached at spaced points along the length of the track. Such units may incorporate, clip like attachments which comprise two similar hook shaped parts or units adapted to be interconnected to produce a substantially C-shaped clip which is adapted to engage over outwardly directed flanges, projecting surfaces or the like on a joist, beam or the like, said parts or units being relatively adjustable so that the size of the clip may be varied within predetermined limits to fit any one of a range of differently sized joists, beams or the like. Preferably, each hook shaped part or unit is so formed that each limb or part thereof which is adapted actually to engage over a flange or projecting surface will comprise two arms or portions which are splayed outwardly relatively to each other. Means are also preferably incorporated, whereby the clip attachment when assembled, may be securely locked in position on any joist, beam or the like, to which it is applied.

In order that the said invention may be clearly understood and readily carried into effect, the same will now be more fully described with reference to the accompanying drawings, in which:

Figure 1 is a cross sectional view on the line 1—1 of Figure 2 showing a roller assembly mounted in position on a conveyor chain, the latter being disposed in a fixed overhead track;

Figure 2 is a side elevational view of the assembly shown in Figure 1;

Figure 3 shows a section through one type of track suitable for use on certain vertical bends;

Figures 8, 8a and 8b show yet another form of roller assembly incorporating a pivoted or swivel clevis attachment;

Figure 9 is a perspective view illustrating the make up of a conveyor chain;

Figure 10 is a side elevational view partly in section showing one form of load bar assembly;

Figure 11 is a section on the line 11—11 of Figure 10;

Figure 12 is a plan view of a clip element employed in the suspension of the conveyor track;

Figure 13 illustrates apparatus utilized in the suspension of the conveyor track.

Figure 14 illustrates one manner in which the conveyor track may be suspended from an overhead joist or the like.

Figure 4:
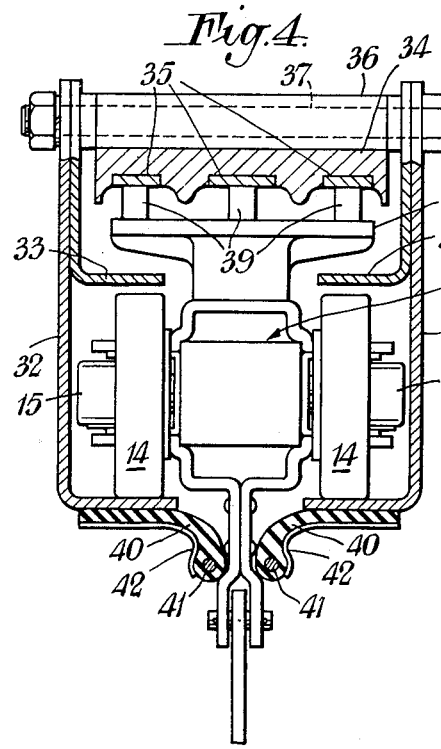
Figure 4 is a cross sectional view of a modified trolley assembly and track incorporating a bus bar or current collector assembly.

Referring now to the drawings, it will be seen that an endless driven conveyor chain designated generally by 10 is adapted to run in a track, designated generally by 11, which is of rectangular or box-like section, such track having a longitudinally extending slot or passageway in the centre of the base thereof, through which load supporting bars or the like are adapted to project. As indicated in Figure 9, the chain may be made up in known manner from a series of substantially U-shaped links 12, successive links being turned through 90° relatively to each other and connected by means of connecting pins 13. The construction of the chain is well known and will not be further described herein.

It is proposed to support the chain 10 within the track 11 by virtue of the application to said chain of a plurality of trolley assemblies, one suitable form of which is indicated in Figures 1 and 2. Referring now to those figures, it will be seen that each trolley assembly includes a pair of wheels or rollers 14 rotatable about a horizontal axis and a second pair of wheels or rollers 15 rotatable about vertical axes, such wheels or rollers being adapted to engage and run on the internal surfaces of the track 11 and thereby to support the chain. Each trolley assembly comprises an upper or yoke member 16 and a lower or clevis member 17 which are so designed as to be applied respectively to the top and bottom faces of the chain link, in such a manner as to extend transversely with respect to the longitudinal axis of the chain. As indicated, each clevis member 17 may conveniently comprise two strip or plate like elements of substantially inverted L-shape which are arranged back to back and are rigidly secured together as by riveting or welding, thereby to provide a member of substantially T-shape, the arrangement being such that when the clevis member 17 is applied to the chain, the vertical limb thereof will depend vertically from said chain and through the slot or passageway in the base of the track. The yoke and clevis members 16 and 17 are so dimensioned that when in position on the chain they will project laterally therefrom, thereby to provide at each side of said chain a seating or a support for a wheel hub. Each wheel hub comprises a circular disc like member 18 having a centrally disposed aperture therein, such aperture being so shaped and dimensioned that the hub may be fitted over the projecting end portions of the yoke and clevis members at either side of the chain. When the two hubs 18 are in position on the projecting end portions of the yoke and clevis member at opposite sides of the chain they will serve to clamp said yoke and clevis members securely about the link of the chain to which they are applied. Each of the hubs 18 is also formed with a peripheral groove or recess adapted to accommodate a ring of balls 19, which are interposed between said hub and an outer rim 20, which latter is of annular form and preferably of U- or substantially U-shape in section. By virtue of the interposition of the balls 19, between the hub 18 and the rim 20, the latter is freely rotatable with respect to the former and thus provides the equivalent of a wheel or roller. Preferably, as indicated in Figure 1, the rim 20 is made up of two annular elements of substantially L-shape in cross section, said elements being relatively so formed and dimensioned as to interfit, thereby to provide a composite annular element of substantially U-shape in cross section. As will be seen from Figure 1, on assembly of the two elements, the edge of the outermost is peened over to hold the two elements in place. Preferably, annular sealing rings will be interposed between the hub and the rim, such rings being adapted to serve as grease retainers and also to prevent ingress of dirt and other foreign matter to the balls.

In order to provide support or guide means for the chain in the lateral direction, each trolley assembly also includes the two guide rollers 15, which are so mounted as to rotate about axes at right angles to the axis of rotation of the first mentioned wheels or rollers, i. e. about vertical axes which are disposed at opposite sides of the chain. Each guide roller 15 is located between the projecting end portions of the yoke and clevis members 16 and 17 at each side of the chain, being rotatably mounted on a pin 21, which is supported at its opposite ends by said projecting end portions of the yoke and clevis members. The arrangement is such that the rollers 15 will project outwardly beyond the ends of the yoke and clevis members 16 and 17, so that when the chain is in position on the track, said rollers will bear on the internal surfaces of the vertical walls of said track. In order to locate each pin 21, the latter is in the embodiment illustrated, formed with a recessed portion or flat 22 at one end thereof to engage a D- or substantially D-shaped aperture in the end portion of the clevis member 17.

In order to assist in securing the various elements of the trolley assembly in position, two clip elements 23 are provided, which are adapted to be introduced one at each side of the chain between the corresponding projecting end portions of the yoke and clevis members. Each clip-like element 23 preferably comprises a strip of metal bent to a U- or substantially U-shape, the two parallel limbs of the clip being themselves formed at their outer or free ends with cut away portions or recesses which will serve to accommodate the pins 21. The base of the clip-like element is also formed centrally with an aperture, adapted to receive the projecting portion of a connecting pin 13 serving to interconnect the links of the chain.

On assembly of a trolley assembly, the yoke and clevis members 16 and 17 are applied to the upper and lower surfaces of a chain link in proximity to the junction between two links. The clip-like elements 23 are then positioned one at each side of the chain between the projecting end portions of the yoke and clevis members 16 and 17, the arrangement being such that the ends of the connecting pin 13 serving to interconnect the links of the chain will engage in the apertures in the bases of the respective clips, thereby to locate the latter. With the clips in position, the packing elements 24 are slid into position over the projecting end portions of the yoke and clevis members, whereafter the guide rollers 15 are introduced. Following the rollers 15 suitable washers are inserted and each roller 15 is secured in place by the insertion of the pin 21, the latter being located in an aperture in the appropriate end of the clevis member 17 while the upper end is located in an aperture in corresponding end of the yoke member 16. The hubs 18 of the two main wheels or rollers are then slid into position and the whole assembly is secured by the introduction of split pins 21a, axially through the pins 21. The application of the hubs serves positively to lock the pins 22 in position against displacement and also to clamp the yoke and clevis members 16 and 17 and thus the whole assembly in position on the chain. Each of said clip-like elements 23 is retained in position and prevented from outward movement by virtue of the presence of the vertical pin 21 carrying the guide roller 15.

In the embodiment shown in Figure 1, it will be seen that the track 11 is made up of L-section rail members 26, which are maintained in spaced parallel relation, being relatively so arranged as to provide a track of substantially U-shape in section but having the requisite central longitudinally extending slot or passageway in the base thereof. The L-section rail members are secured together at spaced points by means of bolts 27 a spacer sleeve 28 being located on each bolt in order to maintain the rail members at the requisite distances apart. The track shown in full lines in Figure 1 is suitable for use on straight runs in a horizontal or substantially horizontal plane. Where vertical bends are required to be introduced in the track, it may be necessary to incorporate cover tracks. In Figure 1, one form of cover track is indicated in chain dotted lines, such cover track comprising two L-section rail members 29 which are similar to the rail member 26, being maintained in the position shown by the bolts 27 and spacer sleeves 28. In Figure 3 a modified track assembly is indicated. In this case, the cover track is formed by two L-section rail members 30 which are arranged back to back and in spaced parallel relation, said rail members 30 and the rail members 26 being maintained in position by bolts 27 and spacer sleeves 31.

Instead of forming the cover tracks in the manner indicated above, it may be desirable merely to locate plates or strips at the upper part of the U-section track wholly or partially to close the latter. For example, it may be desirable to provide two strips or plates which are disposed in spaced parallel relation at each side of and at the upper part of the U-section track formed by the two L-section rail members. Such plates or strips may conveniently be welded to the spacer sleeves or to the tie bolts when such sleeves are not present. Again instead of any of the above arrangements, it may be desirable to provide a single plate or strip which entirely closes the U-section track formed by the L-section rail members, such plate or strip being disposed across the upper part of the track and welded to the spacer sleeves or the bolts. Where joints between successive lengths of rail members 26 occur at points other than points of suspension of the track, the arrangement will preferably be such that the joints at one side of the track will be staggered in relation to the joints between the corresponding rail members at the opposite side of the track. The jointing of any two successive rail members may be effected by means of L-shaped cover pieces which are adapted to be applied over or around the outer surfaces of the aligned and abutting ends of the two lengths of rail members to be joined together. The cover piece is so dimensioned as to mask the joint and to overlap the end portions, of the respective members being adapted to be secured in position by means of a plurality of e. g. four, bolts, which are similar to the bolts 27, two being disposed adjacent the end of each rail section and such bolts being passed through apertures in the cover piece.

Preferably each length of L-section rail member will be provided with a series of apertures conveniently spaced at equal distances apart in order to facilitate assembly.

Figure 4 illustrates a roller assembly which is generally similar to that shown in Figures 1 and 2 but which incorporates at its upper part a collector device for cooperation with a bus bar or current conducting assembly. In this case the conveyor track is made up, as before, of two sets of L-section rail members 32. When the conveyor includes vertical bends, it will be necessary to incorporate cover tracks, such as are indicated at 33. Mounted at the upper part of the track is a bus bar assembly which comprises a housnig 34 moulded from insulating material, such housing being in the form of a plate or strip, so dimensioned as to fit into and extend along the length of the track, thereby to form a closure at the upper part of the latter. The housing 34 may conveniently be made in sections which are adapted to be placed in end to end relationship so that they will extend along the length of the track. The housing 34 or each section thereof is formed at its underside with a plurality, e. g. three, of parallel grooves or channels each adapted to accommodate a conductor strip 35, for example, of copper or other suitable electrically conductive material. The conductor strips 35 may be riveted in position in their respective channels or they may be secured in position by a rolling or other similar operation, such as is described in the specification of prior Patent No. 594,896. The housing 34 or each section thereof may conveniently be formed at its upper face with a plurality of transversely extending ribs or the like, such as 36, each of which is bored longitudinally to accommodate a metal sleeve or insert which will in turn accommodate a fixing bolt 37, such bolts extending through the sleeve or insert in the ribs or the like 36 and through aligned apertures in the rail members 32, thereby to support the housing or each section thereof securely in position.

Mounted at the upper part of each trolley assembly, e. g. on the upper or yoke member 16, associated with the conveyor chain 10 is an insulated collector body 38 which is adapted to project upwardly from said trolley assembly and carries at its upper part a plurality, e. g. three, of contact elements 39 which are so formed and arranged that on passage of the conveyor chain along the track, they (the contact elements) will co-operate with the conductor strips 35 carried by the aforesaid housing 34. Connected to the contact elements is a power cable or conductor which is guided through the conveyor chain and is adapted to pass through the slot in the base of the track, said cable or conductor being coupled to the equipment associated with the conveyor.

In order to obviate the possibilities of undesired contact, either by operatives or tools or equipment, with the live current conducting elements of the bus bar assembly, an insulating shield or cover is provided over the slot or passageway in the base of the track. Such shield or cover is conveniently formed by two strip like elements 40 of moulded rubber, which are applied to the underside of the track, one along each side of said slot or passageway, said strip like elements 40 being so formed and dimensioned that normally the outer or free edges thereof, hereafter termed the "lip portions," will abut against each other, thereby completely to seal and to prevent access to the slot or passageway. By virtue of the inherent resilience of the strip like cover or sealing elements, passage of the depending clevis attachments or load bars associated with the conveyor will not be hindered since on passage of such attachments, or bars, the lip portions of the sealing elements 40 will be forced apart in the immediate vicinity thereof, returning to their normally closed position at any point as soon as the attachment or bar has passed such point. In order to stiffen the normally contacting lip portions of the sealing strips 40, it may be desirable to incorporate one or more longitudinally extending tensioning wires, such as are indicated at 41 in said lip portions during the moulding process. Furthermore, in order to reinforce or strengthen the resilience of the sealing strips, it may be desirable, at spaced points along the length of such strips, to provide spring steel clips or supporting elements 42 which are shaped to conform to the external shape of the sealing strips 40 and are adapted, when in position, normally to urge said strips into the closed or sealing position.

It desired, the bus bar and current conducting assembly and the insulating sealing means may be applied to a system wherein load carrying trolleys and collectors are employed without a conveyor chain.

In such a case, each trolley may include four or any other suitable number of rollers adapted to rotate about normally horizontal axes and one or more guide rollers which is or are adapted to rotate about a vertical axis or vertical axes and is or are adapted to guide the trolley around horizontal bends or curves in the track.

Figure 5:
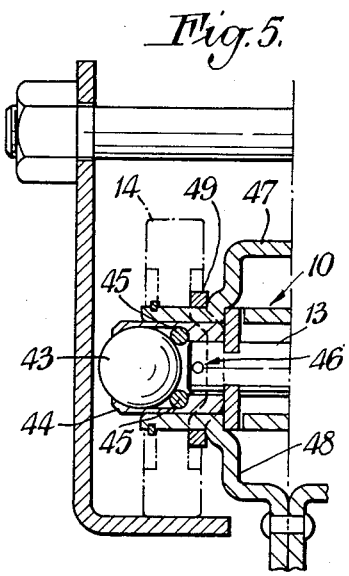
Figures 5 and 6 illustrate modified roller assembly constructions.

In Figure 5, a modified type of roller assembly is indicated. In this case the lateral rollers 15 of the embodiment shown in Figures 1, 2 and 4 are replaced by balls, one of which is indicated at 43. Each ball 43 is maintained in a cup like element 44, such element also housing a ring of relatively small balls 45 which serve to provide an anti friction seating for the ball 43. The cup like element 44 which replaces the clip element 23 of the preceding embodiment is located on the projecting end portion of the chain link connecting pin 13 being secured thereto by means of a pin 46. In the embodiment illustrated in Figure 5, it is necessary to modify slightly as shown, the construction of the yoke and clevis members 47 and 48 which correspond to the members 16 and 17 and also to modify the shape of the packing element 49 which corresponds to the element 24. The manner of assembly of the embodiment shown in Figure 5 will be obvious having regard to the description of Figures 1 and 2. Conveyor chains incorporating assemblies such as illustrated in Figure 5 may be employed in any of the tracks indicated above and it will be obvious that such assemblies may readily be adapted for use with bus bar or current conducting assemblies of the kind indicated in Figure 4.

Figure 6:
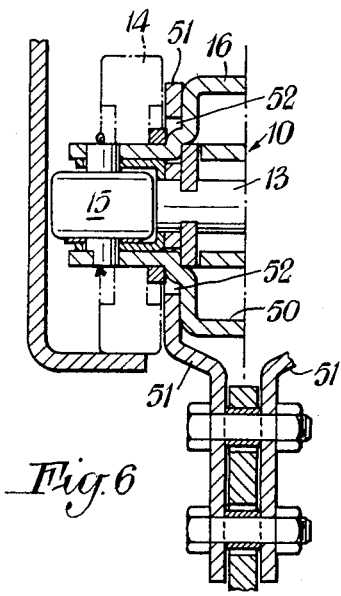
Figure 7:
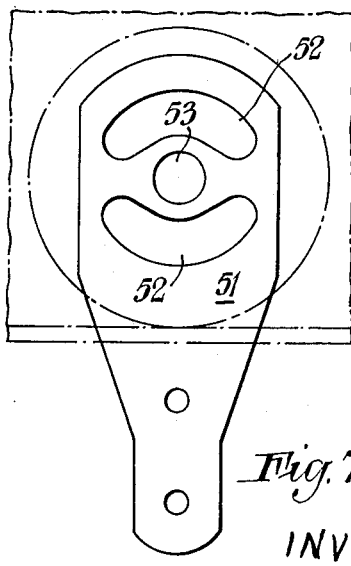
Figure 7 is a side elevational view of a clevis attachment employed in the assembly shown in Figure 6.

Figures 6 and 7 show a further modification wherein the depending clevis or load bar attachment is so mounted as to be capable of pivotal or angular movement. In this case, the roller assembly is similar to that illustrated in Figures 1 and 2 with the exception that instead of forming the lower member 17 as a clevis attachment and in two parts as shown in the preceding figures, such member comprises a single or one piece unit as indicated at 50 which is similar to the upper member 16. The clevis attachment comprises two similar plates or the like 51, each of which is in the embodiment illustrated, formed with a pair of arcuate slots 52 and a central aperture 53. If desired, the plates 51 may be modified to dispense with the uppermost slot 51.

On assembly of the embodiment shown in Figures 5 and 7, the yoke members 16 and the lower members 50 are placed one above and one below the chain and the clevis plates 51 are then applied one to each side so that the projecting end portions of said members 16 and 50 will pass through the slots 52 on each plate while the end of the chain link connecting pin 13 will project through the central aperture 53. With the clevis attachment in position, the assembly proceeds as before. It will be appreciated with in this case the clevis attachment comprising the two plates 51 will be capable of pivotal movement about the axis of the pin 13, the extent of such movement being determined by the length of the slots 52.

It will be obvious that the embodiment shown in Figures 6 and 7 may readily be modified to incorporate balls in place of the rollers 15 and/or also, if desired, to incorporate a current collector device for use with a bus bar or current conductor assembly.

In Figures 8, 8a and 8b a further modification is indicated and in this case a yoke member 54 is provided which is adapted to be placed over the top of the conveyor chain, such member being formed, in the manner shown, in Figure 8a. In place of the lower or clevis member, two members, such as are indicated at 55, are provided, each of which is formed with a slot 56, as indicated, in Figure 8b. On assembly of the embodiment shown in Figures 8, 8a and 8b, a pair of clevis plates, one of which is indicated at 57, are applied one to each of the projecting end portions of the chain link connecting pin 13, said plates being formed with suitable apertures, so that they will be capable of pivotal movement about the axis of said pin. With the clevis plates 57 in place, the yoke member 54 is applied to the chain whereafter the members 55 are slid into position. The slot 56 in each member 55, is adapted to accommodate a reduced or slotted portion of the pin 13, so that the latter is locked against endwise movement. Wing portions 58 on the member 57 are adapted to mask the edges of the appropriate portion of the yoke member 54. Prior to the member 55 being finally seated in position, the pin 59 carrying the lateral roller 15 is introduced, such pin having its ends cut away so that it is adapted to fit D-shaped apertures in the respective members 54 and 55. With the members 54 and 55 assembled and the rollers 15 in position, the hubs 18 are then applied, followed by spacer elements 60. Each spacer element 60 is finally locked in position by a pin 61. A lug 62 on the member 55 serves to locate the hub 18 which latter, as in the preceding embodiments, serves to support a ring of balls and an outer race or rim.

With the embodiment shown in Figure 8, the clevis attachment is capable of free pivotal or swivelling movement. Preferably, the clevis plates will, as shown, be supported on bearing sleeves or bushes, journalled on the pin 13.

In Figures 10–12 a load bar assembly is shown which is suitable for application to any of the chain and roller assemblies indicated above. Referring now to those figures, it will be seen that the load bar assembly comprises an elongated strip of metal 63, the longitudinally extending edge portions of which are bent upwardly and inwardly as is clearly shown in Figure 11, in order to provide an elongated bar or carrier having channelled upper surface. Disposed at or adjacent each of the opposite ends of the bar or carrier is a pivot assembly, designated generally by 64, 65, by means of which said bar or carrier may be connected to the depending load bars or clevis attachments of two adjacent trolley assemblies on the conveyor. As will be clearly seen from Figure 11, each pivot assembly comprises two L-shaped brackets 66 which are arranged back to back and spot welded, or otherwise secured together, thereby to provide an inverted T-shaped element, the horizontal limbs of which are adapted to fit under the turned over edge portions of the bar 63. The vertical limb of the inverted T-shaped element is provided at or adjacent its upper end with a suitable aperture to allow of its connection to the lower end of the depending clevis attachment on the trolley assembly. The pivot assemblies 64, 65 are each capable of angular or rotational movement about a vertical axis, the ends of the horizontal limbs of the T-shaped elements which fit under the turned over edge portions of the bar 63 being suitably radiused, as is indicated in dotted lines in Figure 12. One of the pivot assemblies, i. e. the assembly 64 as shown, in addition to being capable of angular or rotational movement is also capable of sliding movement lengthwise of said bar 63 in order to enable the latter to negotiate horizontal and vertical bends. The second pivot assembly 65 while being capable of angular or rotational movement is nevertheless prevented from or allowed only limited sliding movement lengthwise of the bar, suitable stops, e. g. in the form of cheese head bolts or the like 67, being associated with the latter in order positively to locate said assembly. At spaced points intermediate its ends the elongated bar or carrier 63 is formed with two depending ears or lugs 68 which are stamped out therefrom and are turned downwardly to provide connecting means for two load supporting bars 69, the latter being pivotally connected to said ears or lugs and being themselves interconnected at their outer or free ends, thereby to provide a substantially V-shaped suspension unit for the load. The V hanger formed by the load bars 69 may be employed without the bar or carrier 63, in which case said bars may be attached directly to the clevis attachments of two adjacent trolley assemblies.

The tracks in which the chains and their associated roller assemblies are adapted to travel may be suspended from overhead joists or beams and one convenient method of suspension will be described with reference to Figures 13 and 14.

Referring now to those figures, it will be seen that a clip attachment is provided which is adapted to be affixed to an overhead joist indicated at 70. The clip attachment comprises two identical parts designated generally by 71 and 72 which are adapted on assembly to form a substantially C-shaped clip, said parts being capable of relative adjustment prior to being finally secured together so that the clip attachment may be adjusted to fit over the flanges of any one of a range of differently sized rolled steel joists or the like. Each part of the clip attachment is of substantially J-shape when seen in side elevation and it is made up, as will be seen from Figure 13, from two platelike elements 73, which are placed together in alignment and subsequently spot welded or otherwise secured together to produce a composite unit. Each platelike element 71 initially comprises a metal sheet or plate of substantially L-shape, a cut or the like being made in the foot or horizontal portion of the L, thereby to provide a tongue or flap 74 which is bent outwardly into a plane at right angles to the plane of the platelike element. The form of the cut or the like is such that when the tongue or flap is bent outwardly, the platelike element will be of substantially J-shape in side elevation but at the lower part of the longer limb there will be an outwardly directed flap or tongue 74 extending in a plane at right-angles to the plane of the platelike element. On assembly of the two J-shaped platelike elements to form each clip part, the shorter limbs 75 of said elements will not be connected together but will be splayed or bent outwardly relatively to each other, at for example, an angle in the region of 70°. The construction is also such that the two cut out flaps or tongues 74 will, on assembly of said platelike elements, be aligned with each other and project outwardly from opposite sides of the composite clip unit, said flaps or tongues each having an aperture therein which will serve to accommodate a set screw 76. Finally, the longer limb of each composite J-shaped unit will be formed with a plurality of apertures 77 which are spaced at preselected distances apart. In order to produce the complete clip, the two composite J-shaped parts 71, 72 are juxtaposed with their longer limbs in overlapping relationship, as shown in Figure 14, thereby to form the substantially C-shaped clip and with certain of the apertures in the respective parts in register bolts 78 are inserted therethrough, thereby to secure the parts together. It will be appreciated that by relative adjustment of the two parts before bolting together, the size of the clip attachment may be varied to suit any particular joist or the like.

To complete the clip a loose metal plate 79 is provided in respect of each of the composite J-shaped units, each of such plates being adapted to seat on the outwardly directed flaps or tongues 74 of each unit and having threaded apertures therein which are aligned with the apertures in said flap or tongues. The arrangement is such that a set screw or the like 76 may be introduced through the aperture in each flap or tongue and be threaded into the corresponding aperture in the overlying plate 79 to project upwardly therefrom.

The construction is such that when a clip attachment is to be applied to, for example, the lower flanges of a joist as shown at 70 in Figure 14, the two J-shaped parts 71, 72 are applied one to each side of the joist so that the splayed ends 75 of the two parts will engage one over the top of each of the lower flanges while the longer limbs will extend across the bottom of the joist in juxtaposed parallel relationship. The two parts are adjusted to bring apertures 77 in the longer limbs of each into register whereupon the connecting bolts 78 are inserted, in order securely to interconnect the parts and to produce the complete clip which thus embraces the lower flanges of the joist. With the clip in position, the plate 79 supported by the flanges or tongues 74 of each part will lie below and parallel to the underface of the joist so that on tightening of the set screws 76, the latter may be caused to bite into the underside of the joist and thus lock the clip securely in position. By virtue of the fact that the ends 74 of the clip parts are splayed outwardly, the clip will be completely stable and there will be no tendency for the same to tilt or move angularly relatively to the joist.

In order to allow for the attachment of hangers or supports for the conveyor tracks, a support plate or bracket 80 is provided which is adapted to be secured to the clip attachment to depend therefrom. Such plate or bracket may conveniently include two or more slots or apertures 81 which are so disposed as to register with any of the apertures 77 in the longer limbs of the J-shaped parts of the clip, said plate or bracket being adapted to be secured in position to depend from the clip by means of the bolts 78 which are employed to secure said clip parts together. The depending plate or bracket 80 is also provided with one or more additional slots, apertures or the like therein to allow of ready attachment of suspension fittings thereto.

Secured to the plate or bracket 80 by means of a bolt 82 which is introduced through the aforesaid additional aperture in the latter, is a tubular or sleevelike element 83 which is adapted to accommodate or form a socket for a length of conduit 84. The element 83 is formed with an aperture or series of apertures such as 85, the arrangement being such that when the conduit 84 is introduced into said element, it (the conduit) may be locked in place by means of a peg or pegs introduced through the aperture or apertures 85, such peg or pegs being pressed into position by a C-clamp or other suitable device, in such a manner as to form an indentation or depression in the wall of the conduit. In order to prevent displacement of the peg or pegs a sheet metal cover or clip 87 is applied over the exterior of the sleeve like element 83, thereby to mask said peg or pegs and to prevent undesired displacement or withdrawal thereof, said cover or clip being maintained in position by a set screw 86. Similarly affixed to the lower end of the conduit 84 is a second similar sleevelike element 88 to which is bolted a hanger element or plate 89. Attached to the plate 89 is a pair of bracket elements 90 which form a stirrup and which are adapted to be attached to the bolt 27 serving to interconnect the rail members 26 of the conveyor track. Preferably suitable reinforcement members, such as are indicated at 91 will be incorporated.

With fixing means of the kind indicated above, it will be appreciated that it will be possible, with standard or uniform fittings to suspend conveyors from differing sized joists and also readily to provide suspensions of differing lengths (i. e. merely by incorporating a longer or shorter conduit 84) and thereby, for example, to accommodate or allow for variation in the level of the conveyor track.

It will be appreciated that the various integers of the conveyor system above described may be modified in many respects. For example, it is not essential that a trolley assembly should be located at each horizontal chain link connecting pin since, if desired, certain of such assemblies may be omitted. Again, instead of mounting or assembling each trolley assembly at or on a horizontal connecting pin, it may be feasible to locate such trolley assemblies on the vertical connecting pins of the conveyor chains. In such cases, the upper yoke member and the lower or clevis member would be applied as before, one above and one below the chain, each of such members having an aperture centrally thereof to accommodate the appropriate projecting end portion of the chain link connecting pin. With such assemblies the wheels or rollers and/or balls may be mounted and secured in position, as indicated in any of the foregoing examples. Furthermore, it may be feasible in certain cases, to form each chain or certain of such links with a pair of outwardly directed projections, which are integral therewith but which will correspond to the projecting end portions of the yoke and clevis members and will thereby provide mountings for the wheel or roller and/or ball assemblies. Again, it may be feasible to provide clip or bracket-like attachments adapted to fit one over each limb of a chain link and when in position to provide outwardly directed projections which will correspond to the projecting end portions of the yoke and clevis members and will thereby provide mountings for the wheel or roller and/or ball assemblies.

I claim:

1. In a conveyor system of the kind wherein an endless chain is caused to travel in a fixed overhead track, the provision of roller assemblies at spaced points along the chain to cooperate with the track and to provide both lateral and vertical rolling support to said chain, each of such assemblies comprising a yoke member adapted to fit over the chain and to project laterally therefrom at each side thereof, a clevis member adapted to be applied to said yoke member and in conjunction with the projecting portions of the latter to form means which are clamped at each side of said chain, roller means adapted to be introduced between said clamped means at each side of said chain and when in position to project laterally from said clamped means to provide rolling support for the chain in a lateral direction, a pair of stationary hub members adapted, when said roller means are in position between said clamped means to be applied one over each of the latter thereby to clamp said clamped means securely in position and a race element rotatably mounted on each of said hub members to form the equivalent of wheels which will provide rolling support for the chain in a vertical direction.

2. In a conveyor system incorporating roller assemblies as claimed in claim 1, the provision of a load bar attachment comprising an elongated strip like element, a pair of brackets associated with said element so as to be capable of a swivelling movement relatively thereto, said brackets being adapted to allow of attachment to two adjacent roller assemblies and at least one of said brackets being capable of lengthwise sliding movement relatively to said strip like element, and means associated with said latter element to allow of attachment of at least one load bar thereto.

3. In a conveyor system of the kind wherein an endless chain is caused to travel in a fixed overhead track, the provision of roller assemblies at spaced points along the chain to provide both lateral and vertical rolling support for said chain, each of such assemblies comprising upper and lower yoke members adapted to be applied one to each of two opposed surfaces of the chain, said members being so formed that when in position on said chain they will project laterally with respect thereto at each side thereof, a pair of roller elements rotatably supported between the projecting portions of said yoke members, one at each side of the chain to project laterally therefrom and to provide rolling support for said chain in a lateral direction, a pair of stationary hub members adapted to be applied one at each side of said chain and over the projecting portions of said yoke members thereby to clamp the latter in position on the chain and a race element rotatably mounted on each of said hub members to form the equivalent of wheels which will provide rolling support for the chain in a vertical direction.

4. In a conveyor system of the kind wherein an endless chain is caused to travel in a fixed overhead track, the provision of roller assemblies at spaced points along the chain to co-operate with the track and to provide both lateral and vertical rolling support for said chain, each of such assemblies comprising upper and lower yoke members adapted to be applied one to each of two opposed surfaces of the chain, said members being so formed that when in position on said chain, they will project laterally with respect thereto at each side thereof, a depending portion associated with said lower yoke member and adapted to constitute a load bar attachment which will be disposed substantially centrally with respect to the chain, a pair of roller elements rotatably supported between the projecting portions of said yoke members, one at each side of the chain to project laterally therefrom and to provide rolling support for said chain in a lateral direction, a pair of stationary hub members adapted to be applied one at each side of said chain and over the projecting portions of said yoke members thereby to clamp the latter in position on the chain and a race element rotatably mounted on each of said hub members to form the equivalent of wheels which will provide rolling support for the chain in a vertical direction.

5. In a conveyor system of the kind wherein an endless chain formed of a plurality of links hingedly interconnected by connecting pins, is caused to travel on a fixed overhead track, the provision of roller assemblies at spaced points along the chain to co-operate with the track and to provide both lateral and vertical rolling support for said chain, each of such assemblies comprising upper and lower yoke members adapted to be applied respectively to the upper and lower surfaces of the chain in the region of the junction between two successive links, said members being so formed that when in position on said chain they will project laterally with respect thereto at each side thereof, a pair of brackets each having slots therein adapted to allow free passage therethrough of the projecting portions of said yoke members and a central aperture adapted to accommodate the end portion of the connecting pin serving to interconnect the two chain links, said brackets being adapted to be applied over said projecting portions one at each side of the chain in such a manner as to be capable of pivotal movement about the axis of the connecting pin and when in position together to form a depending attachment by virtue of which a load bar may be attached to the chain, a pair of roller elements rotatably supported between the projecting portions of said yoke members one at each side of the chain to project laterally therefrom and to provide rolling support for said chain in a lateral direction, a pair of stationary hub members adapted to be applied one at each side of said chain and over the projecting portions of said yoke members thereby to clamp the latter in position on the chain and a race element rotatably mounted on each of said hub members to form the equivalent of wheels which will provide rolling support for the chain in a vertical direction.

6. In a conveyor system of the kind wherein an endless chain is caused to travel in a fixed overhead track, the provision of roller assemblies at spaced points along the chain to co-operate with the track and to provide both lateral and vertical rolling support for said chain, each of such assemblies comprising upper and lower yoke members adapted to be applied respectively to the upper and lower surfaces of the chain, said members being so formed that when in position on said chain they will project laterally with respect thereto at each side thereof, a pair of clip like elements of substantially U-shape adapted to be disposed one at each side of the chain and to be interposed between the projecting portions of the yoke members, a pair of rollers located one at each side of the chain, said rollers being rotatably supported between the projecting portions of said yoke members and adapted to project laterally with respect thereto to provide rolling support for the chain in a lateral direction, a pair of stationary hub members adapted to be applied one at each side of said chain and over the projecting portions of the yoke members thereby to clamp the latter in position on the chain and a race element rotatably mounted on each of said hub members to form the equivalent of wheels which will provide rolling support for the chain in a vertical direction.

7. In a conveyor system of the kind wherein an endless chain formed of a plurality of links hingedly interconnected by conecting pins, is caused to travel in a fixed overhead track, the provision at spaced points along the chain of roller assemblies adapted to co-operate with the track and to provide both lateral and vertical rolling support for said chain, each of such assemblies comprising upper and lower yoke members adapted to be applied respectively to the upper and lower surfaces of the chain in the region of the junction between two successive links, said members being so formed that when in position on said chain they will project laterally with respect thereto, a pair of clip like elements of substantially U-shape adapted to be disposed one at each side of the chain between the projecting portions of the yoke members, each of said clip like elements having an aperture therein adapted to accommodate an end portion of the connecting pin serving to interconnect the two chain links, a pair of rollers located one at each side of the chain, said rollers being rotatably supported between the projecting portions of said yoke members and adapted to project laterally with respect thereto to provide rolling support for the chain in a lateral direction, a pair of stationary hub members adapted to be applied one at each side of said chain and over the projecting portions of the yoke members thereby to clamp the latter in position on the chain and a race element rotatably mounted on each of said hub members to form the equivalent of wheels which will provide rolling support for the chain in a vertical direction.

8. In a conveyor system of the kind wherein an endless chain is caused to travel in a fixed overhead track, the provision of roller assemblies at spaced points along the chain to co-operate with the track and to provide both lateral and vertical rolling support for said chain, each of such assemblies comprising upper and lower yoke members adapted to be applied respectively to the upper and lower surfaces of the chain, said members being so formed that when in position on said chain they will project laterally with respect thereto at each side thereof, a pair of cup like members adapted to be disposed one at each side of the chain and to be interposed between the projecting portions of the yoke members, a ball supported in each cup member so as to be freely rotatable and to project therefrom in such a manner as to provide rolling support for the chain in a lateral direction, a pair of stationary hub members adapted to be applied one at each side of the chain and over the projecting portions of the yoke members thereby to clamp the latter in position on the chain and a race element rotatably mounted on each of said hub members to form the equivalent of wheels which will provide rolling support for the chain in a vertical direction.

9. In a conveyor system of the kind wherein an endless chain formed of a plurality of links hingedly interconnected by connecting pins, is caused to travel in a fixed overhead track, the provision at spaced points along the chain of roller assemblies adapted to co-operate with the track and to provide both lateral and vertical rolling support for said chain, each of such assemblies comprising upper and lower yoke members adapted to be applied respectively to the upper and lower surfaces of the chain in the region of the junction between two successive links, said members being so formed that when in position on said chain they will project laterally with respect thereto, a pair of cup like members adapted to be disposed one at each side of the chain between the projecting portions of the yoke members, said cup like members being adapted to be fixedly mounted on the end portions of the connecting pin serving to interconnect the chain links, a ball supported in each cup like member so as to be freely rotatable and to project therefrom in such a manner as to provide rolling support for the chain in a lateral direction, a pair of stationary hub members adapted to be applied one at each side of the chain and over the projecting portions of the yoke members thereby to clamp the latter in position on the chain and a race element rotatably mounted on each of said hub members to form the equivalent of wheels which will provide rolling support for the chain in a vertical direction.

10. In a conveyor system of the kind wherein a plurality of links hingedly interconnected by connecting pins is caused to travel in a fixed over-head track, the provision at spaced points along the chain of roller assemblies adapted to co-operate with the track and to provide both lateral and vertical rolling support for said chain, each of such assemblies comprising a yoke member adapted to be applied over the chain in the region of the junction between two successive links and to be secured in position by means of the connecting pin serving to interconnect such links, said member being so formed that when in position the end portions thereof will project laterally at each side of said chain, a pair of clip elements adapted to be applied one to each of the laterally projecting portions of said yoke member to form spaced jaws at each side of said chain, freely rotatable roller means disposed in each of said jaws to project laterally therefrom and to provide rolling support for the chain in a lateral direction, a pair of stationary hub members adapted to be applied one at each side of the chain and over said jaws thereby to clamp the clip elements securely in position on the yoke member and a race element rotatably mounted on each of said hub members to form the equivalent of wheels which will provide rolling support for the chain in a vertical direction.

11. In a conveyor system of the kind wherein an endless chain is caused to travel in a fixed overhead track, the provision of roller assemblies at spaced points along the chain to co-operate with the track and to provide both lateral and vertical rolling support for said chain, each of such assemblies comprising a yoke member adapted to fit over the chain and to project laterally therefrom at each side thereof, a clevis member adapted to be applied to said yoke member and in conjunction with the projecting portions of the latter to form means which are clamped at each side of said chain, roller means adapted to be introduced between said clamped means at each side of said chain and when in position to project laterally therefrom to provide rolling support for the chain in a lateral direction, a pair of stationary hub members adapted when said roller means are in position between said clamped means to be applied one over each of the latter thereby to clamp said clamped means securely in position, a race element rotatably mounted on each of said hub members to form the equivalent of wheels which will provide rolling support for the chain in a vertical direction and current collector means carried by said yoke member and adapted to co-operate with current conducting means disposed within the fixed overhead track.

12. In a conveyor system incorporating roller assemblies as in claim 10, and wherein the fixed overhead track incorporates a longitudinally extending slot in the base thereof through which depending load bars carried by said roller assemblies are adapted to project, the provision of resilient sealing means disposed adjacent the slot in said track, such means being adapted normally to close said slot to prevent undesired access to the interior of the track but not to impede the passage of the load bars associated with said roller assemblies.

References Cited in the file of this patent

UNITED STATES PATENTS

| | | |
|---|---|---|
| 851,701 | Spear | Apr. 30, 1907 |
| 2,187,498 | Landahl | Jan. 16, 1940 |
| 2,251,121 | Daw | July 29, 1941 |
| 2,344,476 | Turnbull | Mar. 14, 1944 |